(12) United States Patent
Huang

(10) Patent No.: US 8,877,319 B1
(45) Date of Patent: Nov. 4, 2014

(54) MULTI-LAYER COMPOSITE STRUCTURE

(71) Applicant: Po Ming Huang, Taichung (TW)

(72) Inventor: Po Ming Huang, Taichung (TW)

( * ) Notice: Subject to any disclaimer, the term of this patent is extended or adjusted under 35 U.S.C. 154(b) by 0 days.

(21) Appl. No.: 13/952,721

(22) Filed: Jul. 29, 2013

(51) Int. Cl.
*B32B 3/30* (2006.01)

(52) U.S. Cl.
CPC ......................................... *B32B 3/30* (2013.01)
USPC .......................................................... 428/141

(58) Field of Classification Search
CPC .......................................................... B32B 15/10
USPC .......................... 428/141, 600; 72/362; 216/52
See application file for complete search history.

(56) References Cited

U.S. PATENT DOCUMENTS

| 3,455,775 A * | 7/1969 | Pohl et al. ...................... 428/461 |
| 2010/0201649 A1* | 8/2010 | Kai et al. ...................... 345/174 |

FOREIGN PATENT DOCUMENTS

GB 2306389 A * 5/1997

* cited by examiner

*Primary Examiner* — Aaron Austin
*Assistant Examiner* — Laura Figg
(74) *Attorney, Agent, or Firm* — Alan Kamrath; Kamrath IP Lawfirm, P.A.

(57) ABSTRACT

A multi-layer composite structure contains metal plates and wooden plates. On a contacting surface of each plate is applied an adhesive. Top surfaces and bottom surfaces of the metal plates are ground by a grinding wheel to form finely concaved patterns. The top surfaces and the bottom surfaces of the metal plates and surfaces of the finely concaved patterns are sandblasted to form plural rough faces which are soaked in a chemical agent to form plural tiny pores, are anodized to generate oxidation, and are back anodized to eliminate oxide. On the top surfaces and the bottom surfaces of the metal plates and the surfaces of the finely concaved patterns are formed plural micro-pores. Thus, when the adhesive is applied on each metal plate and each wooden plate, each metal plate and each wooden plate are stuck together.

11 Claims, 9 Drawing Sheets

MULTI-LAYER COMPOSITE STRUCTURE

FIELD OF THE INVENTION

The present invention relates to a multi-layer composite structure.

BACKGROUND OF THE INVENTION

A metal plate made of aluminum alloy is disclosed in TW Pub. No. 1380914 and contains a plurality of finely concaved holes, and an adhesive is used to stick plural wooden sheets with the metal plate. Since the adhesive penetrates into the plurality of finely concaved holes to stick the metal plate and the plural wooden sheets together, the sticking force is not strong enough. Hence, the metal plate removes from the plural wooden sheets easily.

The present invention has arisen to mitigate and/or obviate the afore-described disadvantages.

SUMMARY OF THE INVENTION

The primary objective of the present invention is to provide a multi-layer composite structure capable of overcoming the shortcomings of the conventional multi-layer composite structure.

To obtain the above objective, a multi-layer composite structure provided by the present invention contains a plurality of metal plates and plural wooden plates stacked together. On a contacting surface of each metal plate and each wooden plate is applied an adhesive for sticking each metal plate and each wooden plate together.

Top surfaces and bottom surfaces of the plurality of metal plates are ground by a grinding wheel to form a plurality of finely concaved patterns. The top surfaces and the bottom surfaces of the plurality of metal plates and surfaces of the plural finely concaved patterns are sandblasted to form plural rough faces. The plural rough faces are soaked in a chemical agent to form plural tiny pores which are dead holes. The plural tiny pores are anodized to generate oxidation and then are back anodized to eliminate oxide. On the top surfaces and the bottom surfaces of the plurality of metal plates and the surfaces of the plural finely concaved patterns are formed plural micro-pores. When the adhesive is applied on the contacting surface of each metal plate and each wooden plate to stick each metal plate and each wooden plate together, the adhesive penetrates into apertures of the plural wooden plates to stick the plurality of metal plates and the plural wooden plates together. By using the plural finely concaved patterns and the plural rough faces, the adhesive sticks the plurality of metal plates securely and enters into the plural finely concaved patterns to stick the plurality of metal plates and the plural wooden plates.

The adhesive penetrates into the plural tiny pores and micro-pores and then solidifies to generate plural support feet inserted into the plurality of metal plates.

DETAILED DESCRIPTION OF THE PREFERRED EMBODIMENTS

Figure 1:
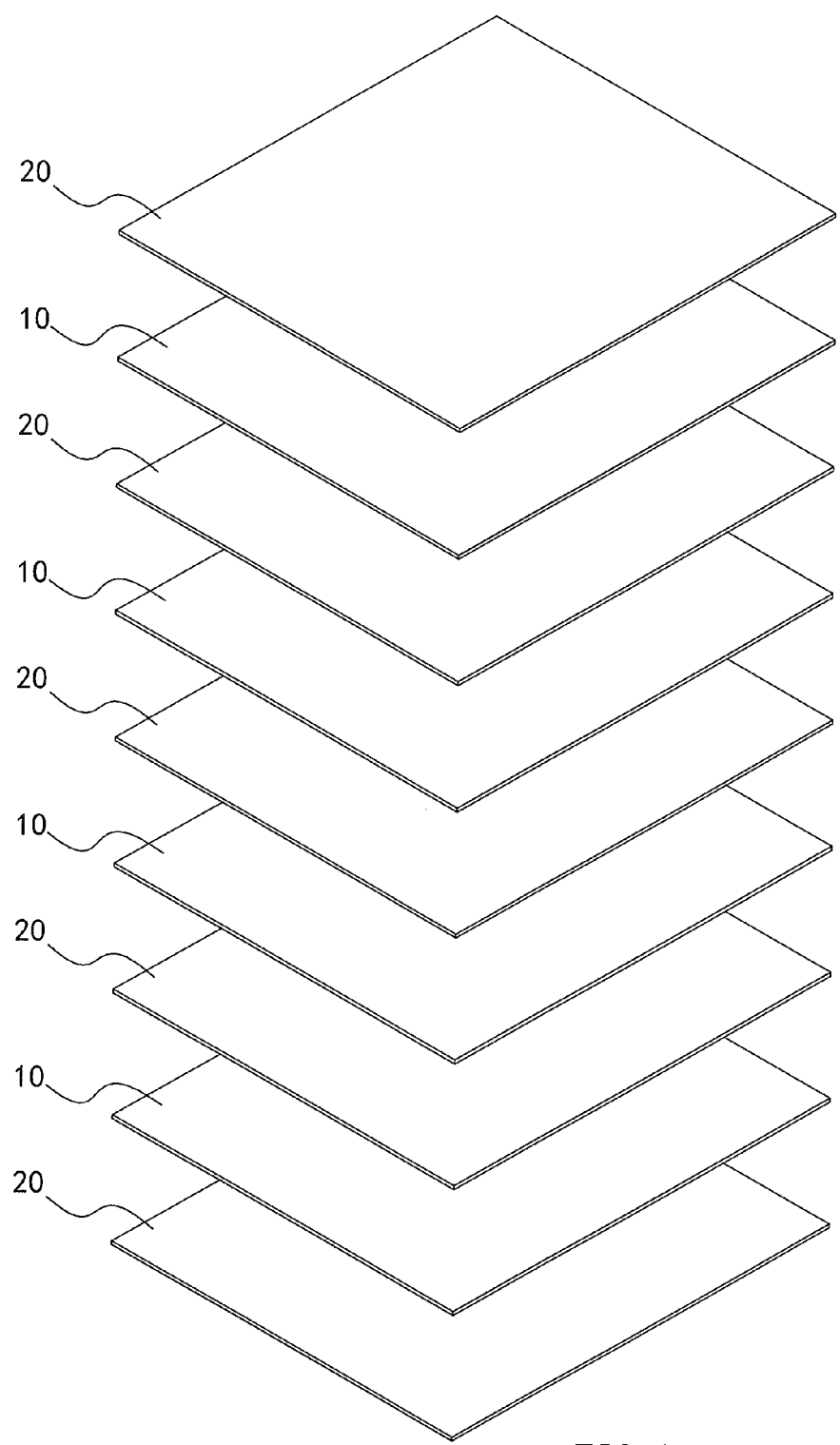
FIG. 1 is a perspective view showing the exploded components of a multi-layer composite structure according to a first embodiment of the present invention.
Figure 2:
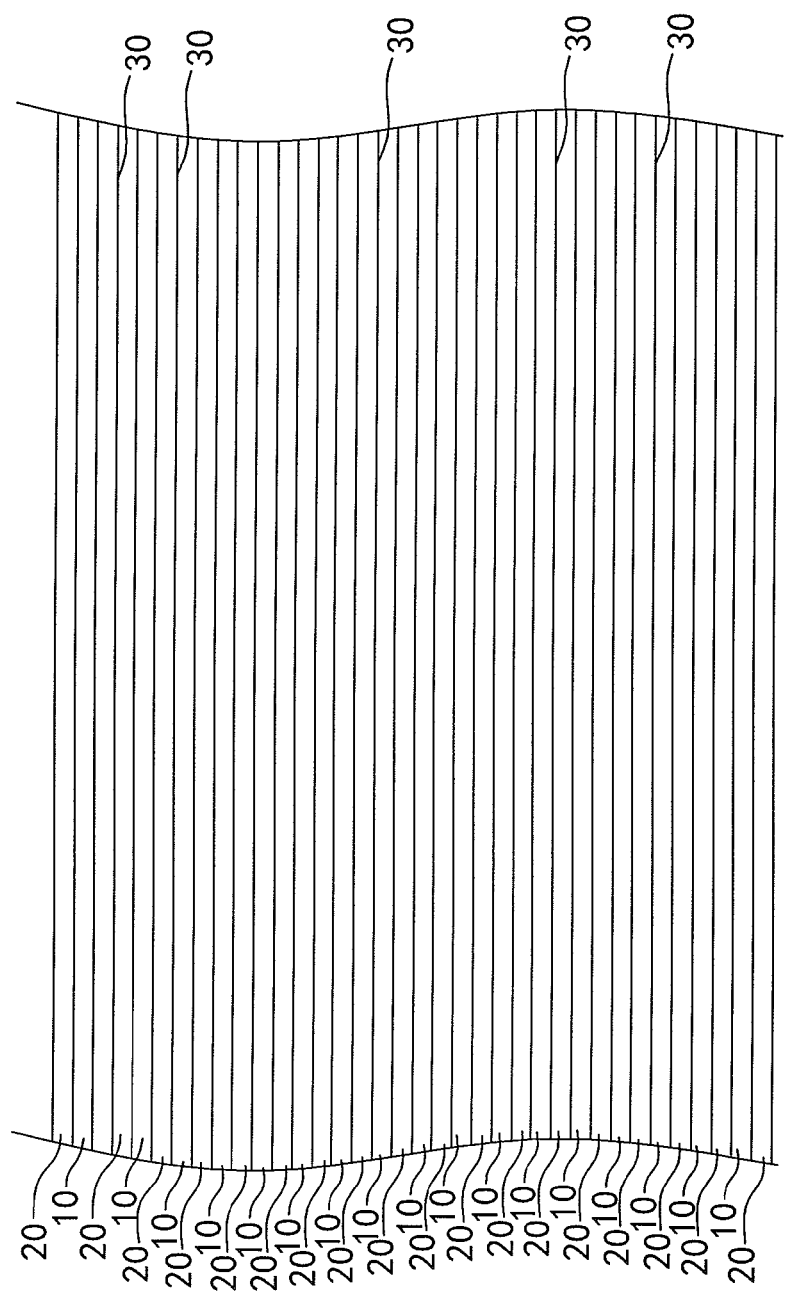
FIG. 2 is a side plan view showing the assembly of a part of the multi-layer composite structure according to the first embodiment of the present invention.
Figure 7:
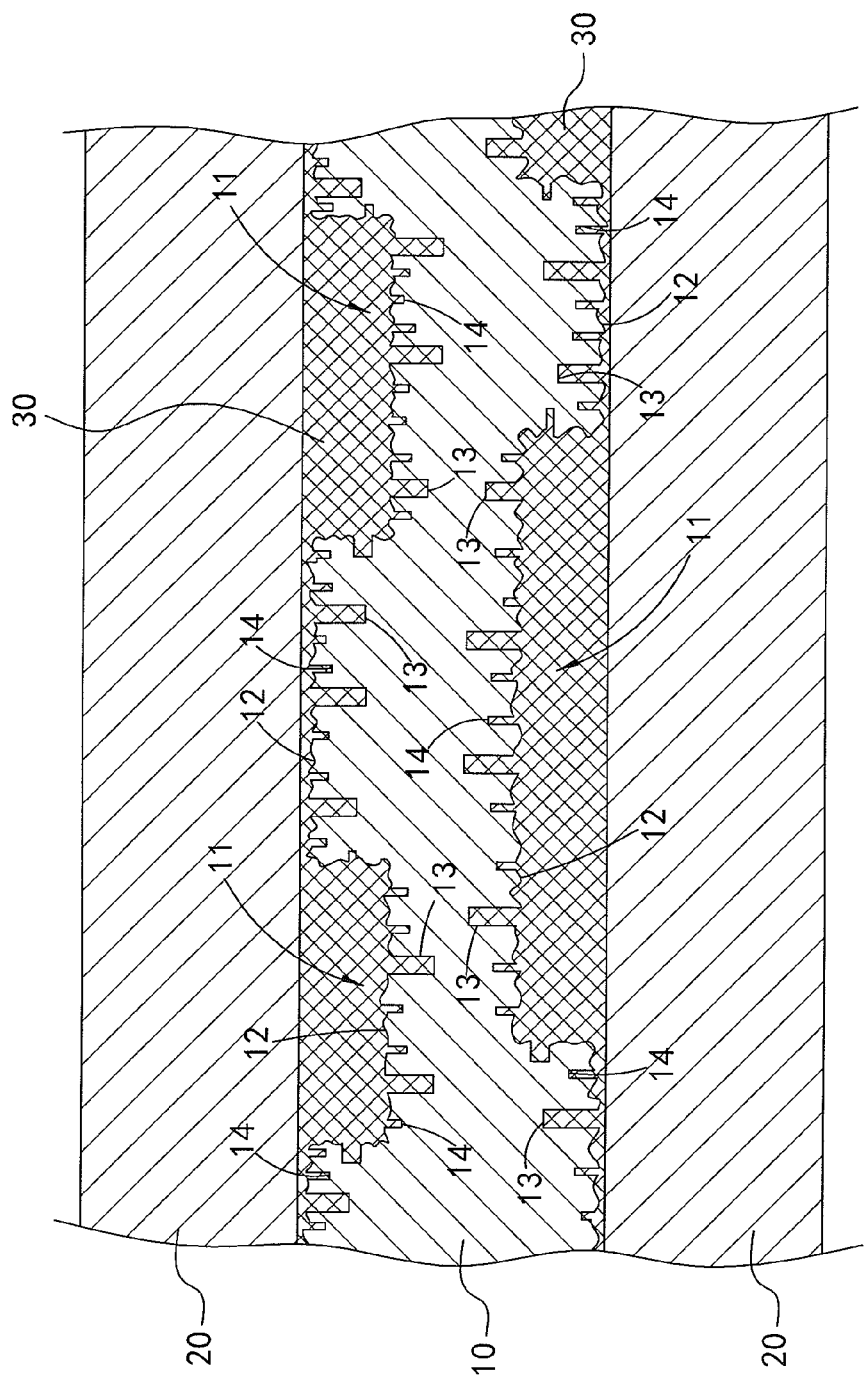
FIG. 7 is a cross sectional view showing each metal plate sticking two wooden plates of the multi-layer composite structure according to the first embodiment of the present invention.

With reference to FIGS. 1, 2 and 7, a multi-layer composite structure according to a first embodiment of the present invention comprises a plurality of metal plates 10 and plural wooden plates 20 stacked together. On a contacting surface of each metal plate 10 and each wooden plate 20 is applied an adhesive 30 for sticking each metal plate 10 and each wooden plate 20 together. A thickness of each metal plate 10 and each wooden plate 20 is within 1 to 2 mm, and each metal plate 10 is made of aluminum alloy.

As shown in FIGS. 3-6, each metal plate 10 is pre-surface finished before being stuck to form plural finely concaved patterns 11, rough faces 12, tiny pores 13, and micro-pores 14.

Figure 3:
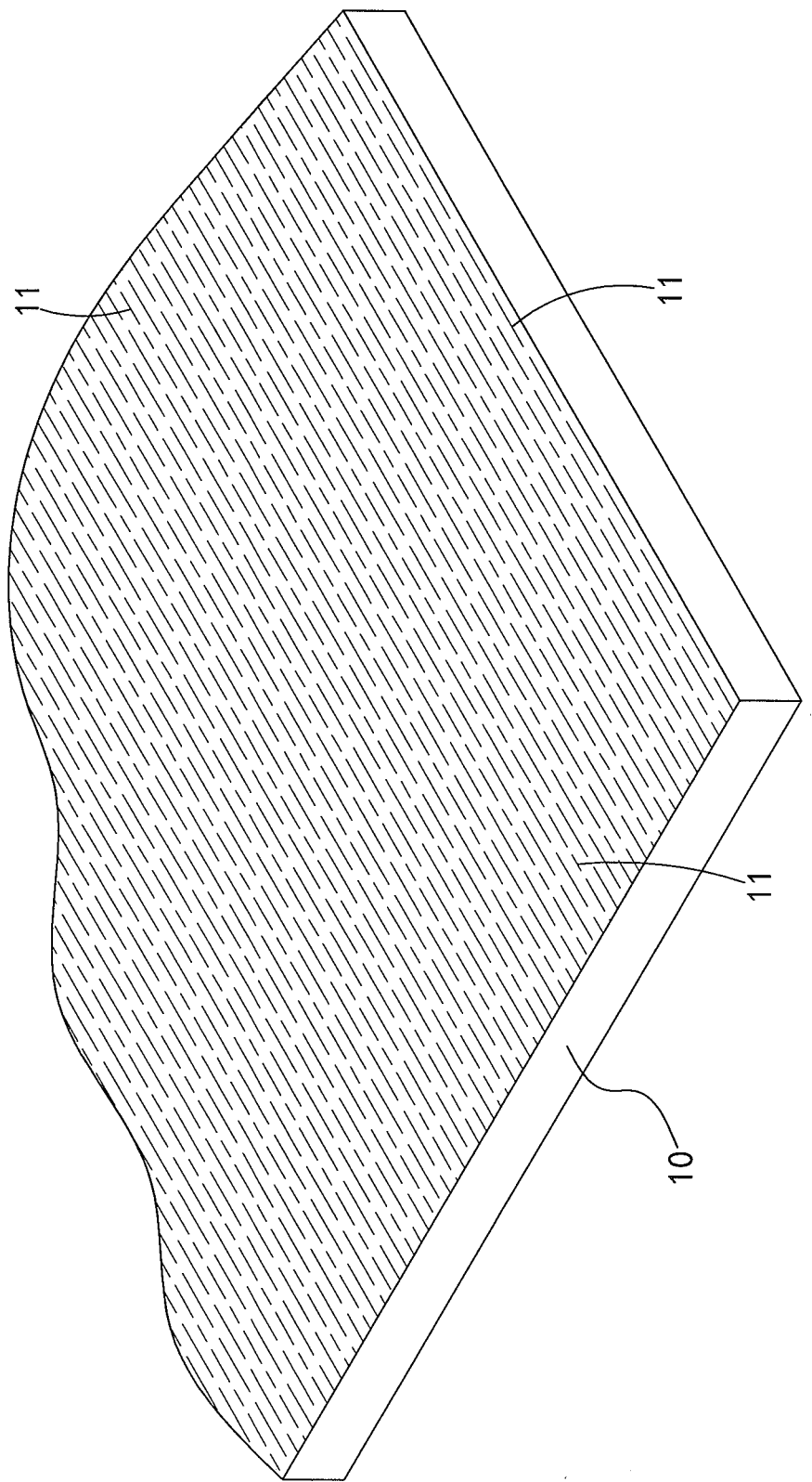
FIG. 3 is a perspective view showing the grinding process of a part of each metal plate of the multi-layer composite structure according to the first embodiment of the present invention.
Figure 4:
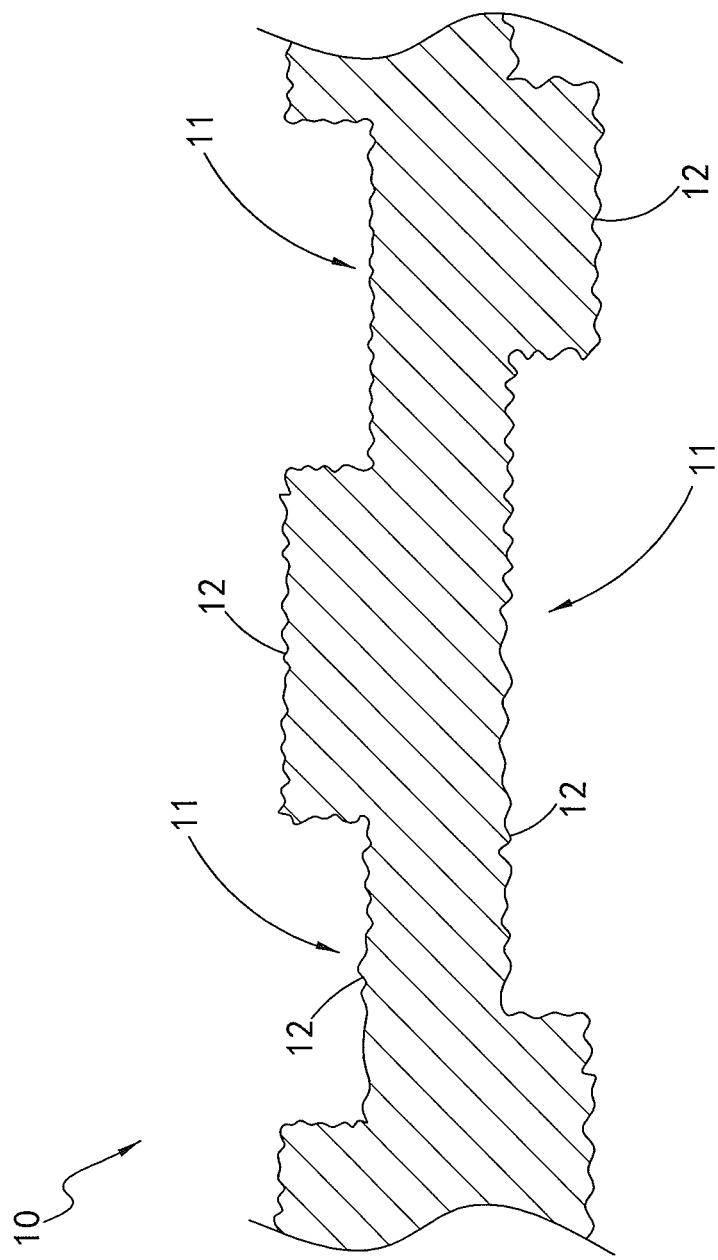
FIG. 4 is a cross sectional view showing the sandblast process of a part of each metal plate of the multi-layer composite structure according to the first embodiment of the present invention.

Referring to FIG. 3, top surfaces and bottom surfaces of the plurality of metal plates 10 are ground by a grinding wheel to form the plural finely concaved patterns 11.

Thereafter, the top surfaces and the bottom surfaces of the plurality of metal plates 10 and surfaces of the plural finely concaved patterns 11 are sandblasted to form the plural rough faces 12.

Figure 5:
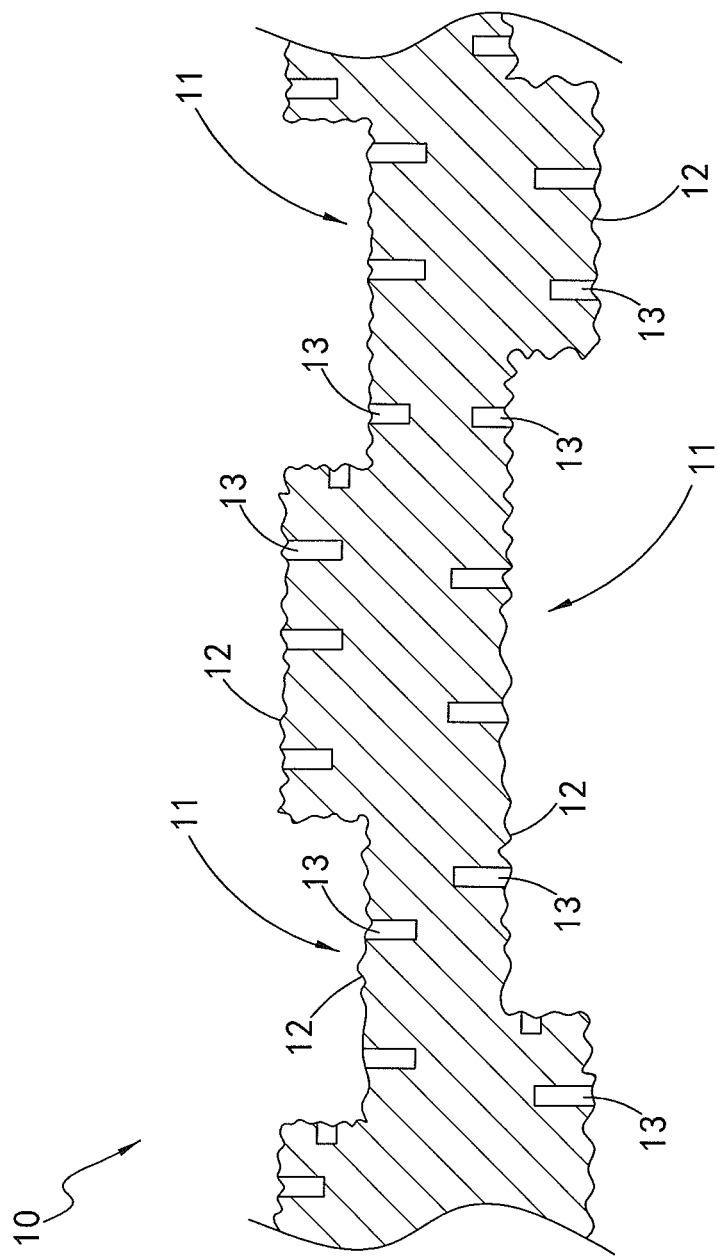
FIG. 5 is a cross sectional view showing the chemical erosion process of a part of each metal plate of the multi-layer composite structure according to the first embodiment of the present invention.

With reference to FIG. 5, after the plural rough faces 12 of the plurality of metal plates 10 are formed for twelve hours, they are soaked in 50% concentration of nitric acid solution for twenty hours to form the plural tiny pores 13 which are dead holes and irregular. A diameter of each tiny pore 13 is within 0.05 to 0.15 mm, and a depth of each tiny pore 13 is within 0.05 to 0.15 mm. In addition, the diameter of each tiny pore 13 is larger than that of each micro-pore 14, and the depth of each tiny pore 13 is larger than that of each micro-pore 14.

Figure 6:
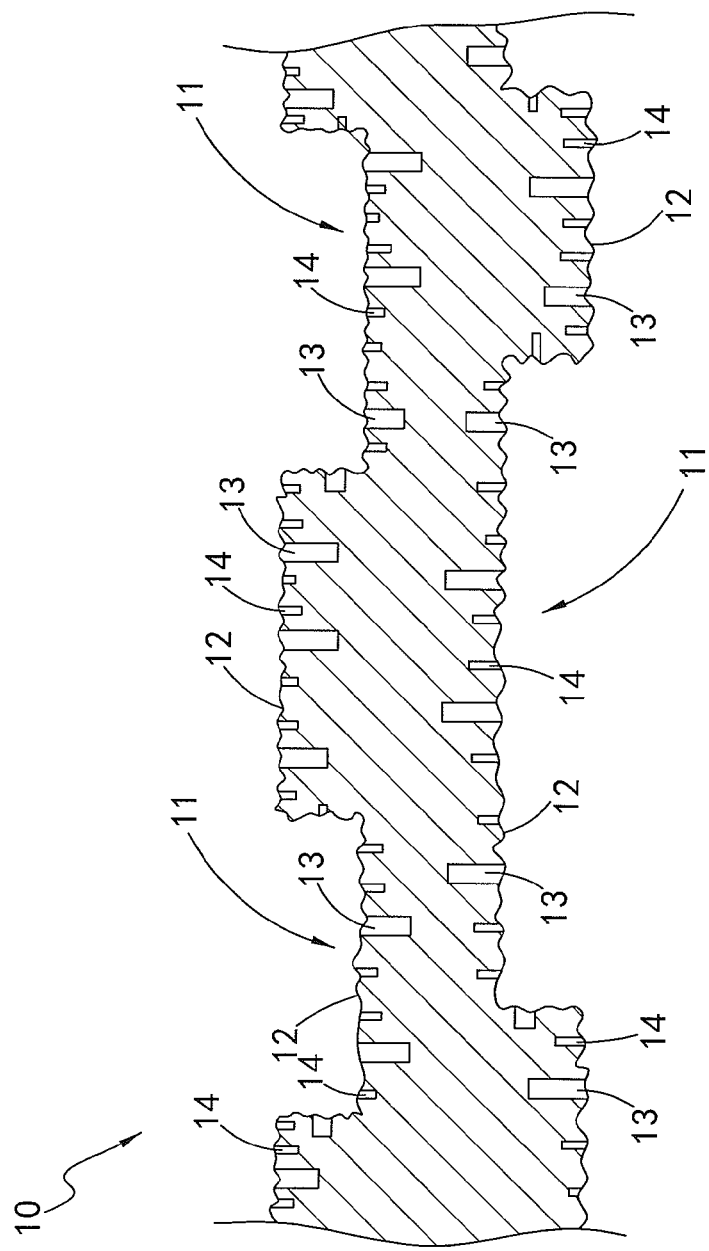
FIG. 6 is a cross sectional view showing the anodizing and back anodizing process of a part of each metal plate of the multi-layer composite structure according to the first embodiment of the present invention.

As shown in FIG. 6, after the plural tiny pores 13 form the dead hole, they are anodized to generate oxidation and then are back anodized to eliminate oxide. Thus, on the top surfaces and the bottom surfaces of the plurality of metal plates 10 and the surfaces of the plural finely concaved patterns 11 are formed plural micro-pores 14.

As illustrated in FIG. 7, when the adhesive 30 is applied on the contacting surface of each metal plate 10 and each wooden plate 20 to stick each metal plate 10 and each wooden plate 20 together, the adhesive 30 penetrates into apertures of the plural wooden plates 20 to stick the plurality of metal plates 10 and the plural wooden plates 20 together. By using the plural finely concaved patterns 11 and the plural rough faces 12, the adhesive 30 sticks the plurality of metal plates 10 securely and enters into the plural finely concaved patterns 11 to stick the plurality of metal plates 10 and the plural wooden plates 20 tightly. Also, the adhesive 30 penetrates into the plural tiny pores 13 and the micro-pores 14 and then solidifies to generate plural support feet inserted into the plurality of metal plates 10, thus reinforcing the plurality of metal plates 10.

Figure 8:
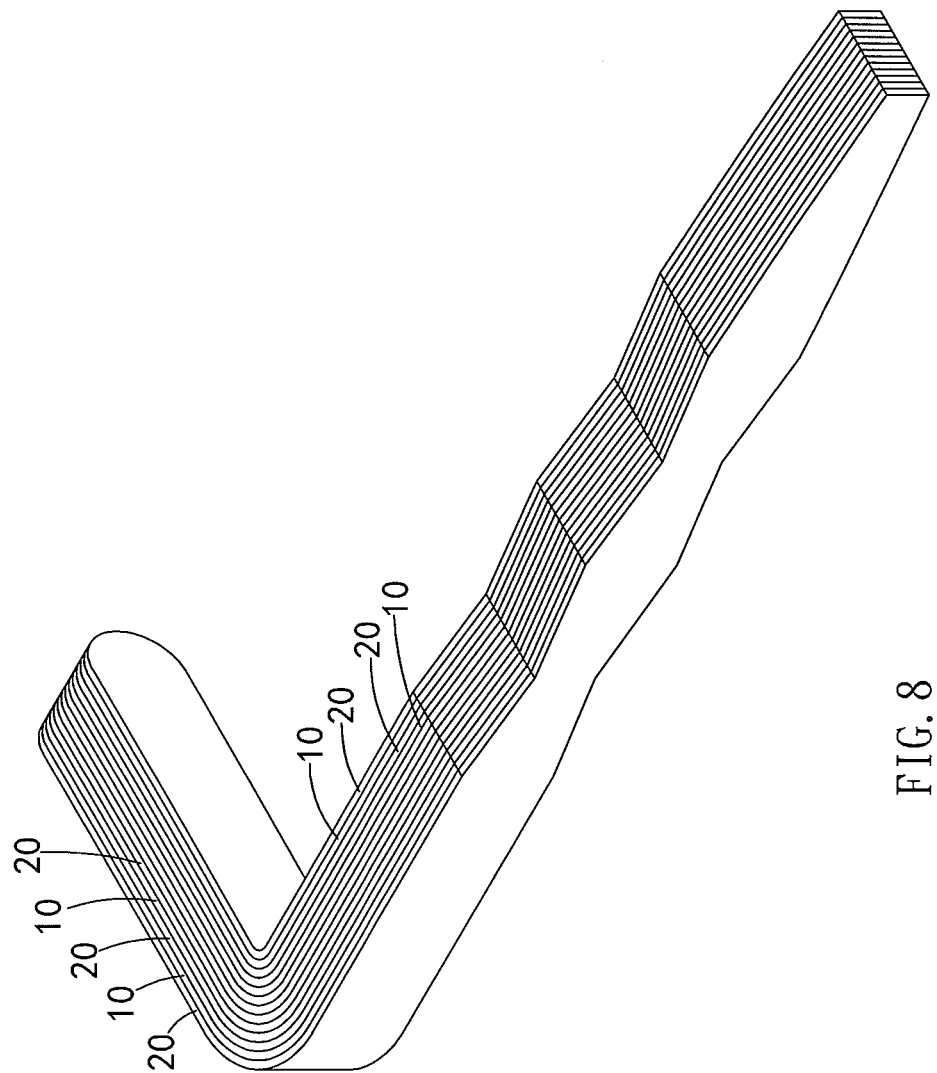
FIG. 8 is a perspective view showing the application of the multi-layer composite structure according to the first embodiment of the present invention.

As shown in FIG. 8, the multi-layer composite structure is used to form machined parts with an aesthetic appearance.

Figure 9:
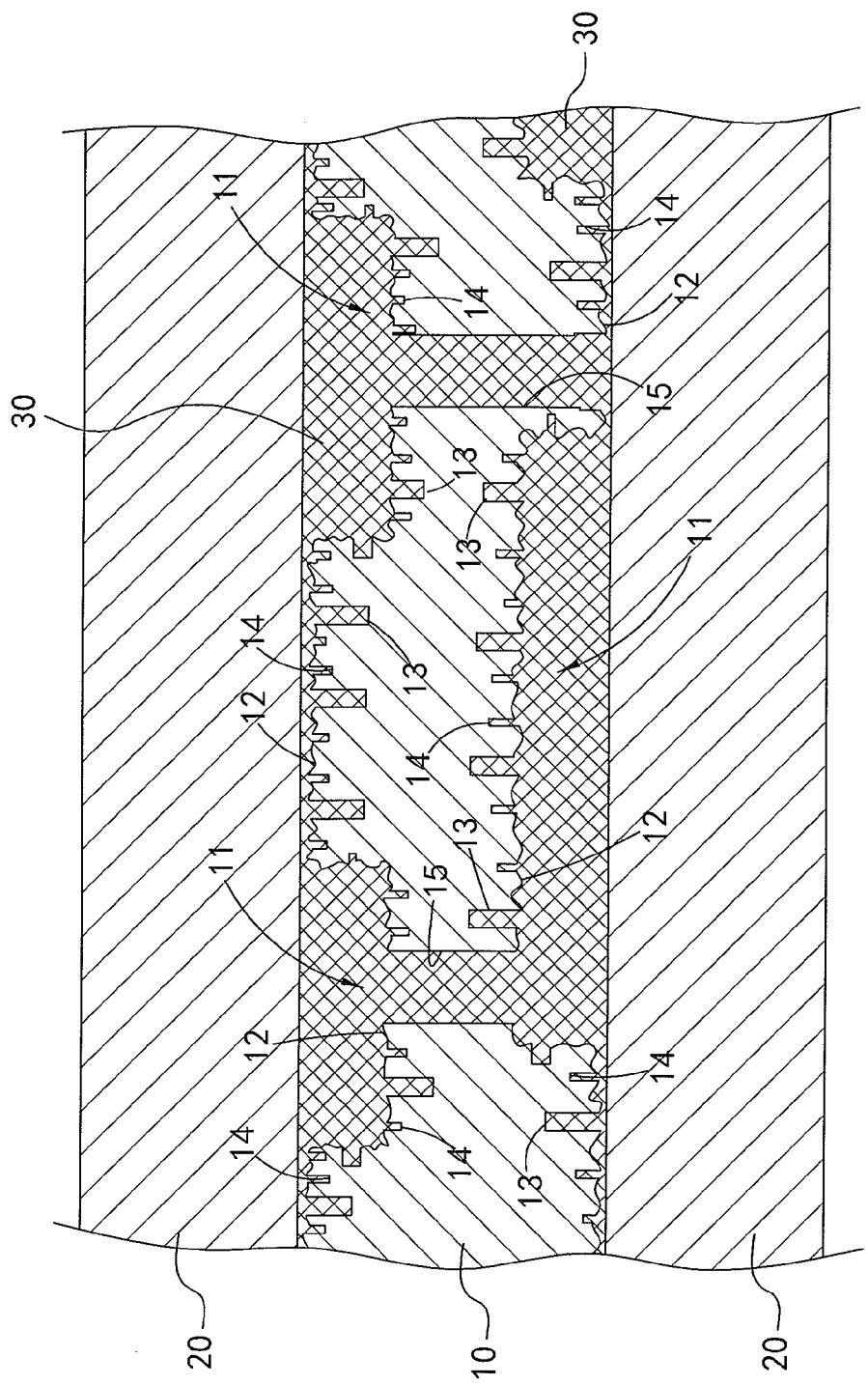
FIG. 9 is a cross sectional view showing the assembly of a part of a multi-layer composite structure according to a second embodiment of the present invention.

Referring further to FIG. 9, a difference of a multi-layer composite structure of a second embodiment from that of the first embodiment is that the plural micro-pores 14 are drilled by a CNC machining center to form a plurality of orifices 15. A diameter of each orifice 15 is 0.2 to 0.4 mm so that the adhesive 30 penetrates into the plurality of orifices 15 to stick the top surface and the bottom surface of each metal plate 10 with two wooden plates 20 together.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A multi-layer composite structure comprising:
a plurality of metal plates and plural wooden plates stacked together, wherein on a contacting surface of each metal plate and each wooden plate is applied an adhesive for sticking each metal plate and each wooden plate together;
wherein a plurality of finely concaved patterns are ground on top surfaces and bottom surfaces of the plurality of metal plates by a grinding wheel to form a plurality of finely concaved patterns, wherein plural rough faces are sandblasted on the top surfaces and the bottom surfaces of the plurality of metal plates and surfaces of the plural finely concaved patterns, wherein plural tiny pores are formed on the plural rough faces by soaking in a chemical agent, wherein each tiny pore is a dead hole, wherein each tiny pore has a size parallel to the corresponding rough face, wherein the plural tiny pores are anodized to generate oxidation and then are back anodized to eliminate oxide, wherein plural micro-pores are formed on the top surfaces and the bottom surfaces of the plurality of metal plates and the surfaces of the plural finely concaved patterns, wherein each micro-pore has a size parallel to the corresponding rough face smaller than the size of each tiny pore, wherein the adhesive applied on the contacting surface of each metal plate and each wooden plate to sticks each metal plate and each wooden plate together, wherein the adhesive penetrates into apertures of the plural wooden plates to stick the plurality of metal plates and the plural wooden plates together, wherein the adhesive sticks the plurality of metal plates securely and enters into the plural finely concaved patterns and the plural rough faces to stick the plurality of metal plates and the plural wooden plates; and
wherein the adhesive penetrates into the plural tiny pores and the plural micro-pores and then solidifies to generate plural support feet inserted into the plurality of metal plates.

2. The multi-layer composite structure as claimed in claim 1, wherein the plural micro-pores are drilled by a CNC machining center to form a plurality of orifices, wherein the adhesive penetrates into the plurality of orifices to stick the top surface and the bottom surface of each metal plate with two wooden plates together.

3. The multi-layer composite structure as claimed in claim 1, wherein a thickness of each metal plate and each wooden plate is within 1 to 2 mm.

4. The multi-layer composite structure as claimed in claim 2, wherein a thickness of each metal plate and each wooden plate is within 1 to 2 mm.

5. The multi-layer composite structure as claimed in claim 1, wherein the plural tiny pores are irregular, and wherein a diameter of each tiny pore is within 0.05 to 0.15 mm, and wherein a depth of each tiny pore is within 0.05 to 0.15 mm.

6. The multi-layer composite structure as claimed in claim 2, wherein the plural tiny pores are irregular, and wherein a diameter of each tiny pore is within 0.05 to 0.15 mm, and wherein a depth of each tiny pore is within 0.05 to 0.15 mm.

7. The multi-layer composite structure as claimed in claim 1, wherein after the plural rough faces of the plurality of metal plates are formed for twelve hours and are soaked in 50% concentration of nitric acid solution for twenty hours to form the plural tiny pores.

8. The multi-layer composite structure as claimed in claim 2, wherein after the plural rough faces of the plurality of metal plates are formed for twelve hours and are soaked in 50% concentration of nitric acid solution for twenty hours to form the plural tiny pores.

9. The multi-layer composite structure as claimed in claim 1, wherein each metal plate is made of aluminum alloy.

10. The multi-layer composite structure as claimed in claim 2, wherein each metal plate is made of aluminum alloy.

11. The multi-layer composite structure as claimed in claim 2, wherein a diameter of each orifice is 0.2 to 0.4 mm.

* * * * *